(12) United States Patent
Shen et al.

(10) Patent No.: US 8,976,559 B2
(45) Date of Patent: Mar. 10, 2015

(54) CONTROL METHODS AND POWER CONTROLLERS WITH LOAD COMPENSATION ADAPTED FOR A POWER SUPPLY

(75) Inventors: Yi-Lun Shen, Taipei (TW); Ren-Yi Chen, Hsinchu (TW); Yu-Yun Huang, Taipei (TW)

(73) Assignee: Leadtrend Technology Corporation, Hsinchu (TW)

( * ) Notice: Subject to any disclaimer, the term of this patent is extended or adjusted under 35 U.S.C. 154(b) by 387 days.

(21) Appl. No.: 13/549,908

(22) Filed: Jul. 16, 2012

(65) Prior Publication Data

US 2013/0057234 A1 Mar. 7, 2013

(30) Foreign Application Priority Data

Sep. 7, 2011 (TW) .............................. 100132159 A

(51) Int. Cl.
*H02M 7/217* (2006.01)
*H02M 3/335* (2006.01)
*H02M 1/00* (2006.01)

(52) U.S. Cl.
CPC .. *H02M 3/33507* (2013.01); *H02M 2001/0032* (2013.01); *Y02B 70/16* (2013.01)
USPC .............................. 363/97; 363/21.16; 363/49

(58) Field of Classification Search
USPC .......... 363/21.01, 21.05, 21.08, 21.13, 21.16, 363/49, 97
See application file for complete search history.

(56) References Cited

U.S. PATENT DOCUMENTS

| | | | |
|---|---|---|---|
| 6,519,165 B2* | 2/2003 | Koike | 363/21.12 |
| 7,088,598 B2* | 8/2006 | Yang et al. | 363/21.01 |
| 7,388,763 B2* | 6/2008 | Nakamura | 363/21.15 |
| 7,738,265 B2* | 6/2010 | Trattler | 363/20 |
| 7,773,394 B2* | 8/2010 | Shen et al. | 363/56.11 |
| 8,120,931 B2* | 2/2012 | Chang et al. | 363/21.07 |
| 8,199,531 B2* | 6/2012 | Grande et al. | 363/21.01 |
| 8,199,532 B2* | 6/2012 | Grande et al. | 363/21.01 |
| 8,446,746 B2* | 5/2013 | Coulson et al. | 363/97 |
| 8,780,587 B2* | 7/2014 | Liao et al. | 363/21.01 |
| 8,879,289 B2* | 11/2014 | Lin et al. | 363/97 |
| 2012/0008343 A1* | 1/2012 | Chen et al. | 363/21.09 |
| 2013/0051086 A1* | 2/2013 | Shen | 363/21.13 |
| 2013/0057234 A1* | 3/2013 | Shen et al. | 323/234 |
| 2013/0094254 A1* | 4/2013 | Huang et al. | 363/21.16 |
| 2013/0301302 A1* | 11/2013 | Wu et al. | 363/15 |
| 2013/0301303 A1* | 11/2013 | Shen et al. | 363/15 |
| 2014/0009977 A1* | 1/2014 | Huang et al. | 363/21.16 |
| 2014/0140108 A1* | 5/2014 | Huang et al. | 363/21.15 |

* cited by examiner

*Primary Examiner* — Jeffrey Sterrett
(74) *Attorney, Agent, or Firm* — McClure, Qualey & Rodack, LLP

(57) ABSTRACT

Disclosure includes control methods and power controllers with load compensation adapted for a power supply powering a load. A disclosed power controller comprises a converter and a control circuit. The converter converts the load signal at a first node to output a load-compensation signal at a second node. The load signal corresponds to an output power provided from the power supply to the load, and the converter includes a low-pass filter coupled between the first and second nodes. The control circuit is coupled to an inductive device via a feedback node, for controlling the output power to make a cross voltage of the inductive device approach a target voltage, based on a feedback voltage at the feedback node. The higher the load-compensation signal the higher the target voltage.

14 Claims, 4 Drawing Sheets

CONTROL METHODS AND POWER CONTROLLERS WITH LOAD COMPENSATION ADAPTED FOR A POWER SUPPLY

CROSS-REFERENCE TO RELATED APPLICATION

This application claims priority to and the benefit of Taiwan Application Serial Number 100132159, filed on Sep. 7, 2011, which is incorporated by reference in its entirety.

BACKGROUND

The present disclosure relates generally to switching-mode power supplies and control methods with regard to primary side control and load compensation.

A power supply need provide a steady output voltage at an output power node to power a load. The regulation of the output voltage is commonly achieved by using detection devices, such as resistors and LT431, at a secondary side to detect the output voltage and then passing the detection result to the power controller at a primary side with the help of a photo coupler. This kind of control means is generally referred to as secondary side control.

To eliminate the need of the detection devices at the secondary side and save the electric power there consumed, primary side control (PSC) is developed. PSC achieves the detection of the output voltage at the primary side, employing the theory of inductance coupling.

FIG. 1 demonstrates switching-mode power supply 8 using PSC. Power supply 8 includes a flyback topology 10, which uses a transformer with primary winding PRM, secondary winding SEC, and auxiliary winding AUX to isolate the primary side from the secondary side. As shown in FIG. 1, the primary and secondary sides have different grounds, isolated by the transformer. By switching power switch 15, power controller 18 controls the energizing and de-energizing of the transformer. During a discharge time $T_{DIS}$ when the transformer is de-energizing, secondary and auxiliary windings, SEC and AUX, discharge to charge output power node OUT and operation power node VCC, respectively. Because of inductance coupling, during discharge time $T_{DIS}$, the cross voltage $V_{SEC}$ across secondary winding SEC should be in certain proportion to the cross voltage $V_{AUX}$ across auxiliary winding AUX. Power controller 18 detects cross voltage $V_{AUX}$ via feedback node FB, and voltage-dividing resistors 13 and 14, equivalently detecting cross voltage $V_{SEC}$, which in a way is substantially equivalent to output voltage $V_{OUT}$ at output power node OUT. Based on feedback voltage $V_{FB}$ at feedback node FB, power controller 18 modifies compensation voltage $V_{COM}$ at compensation node COM and accordingly controls the ON time, the OFF time, or the duty cycle of power switch 15. Simply put, PSC monitors cross voltage $V_{AUX}$ across auxiliary winding AUX to regulate output voltage $V_{OUT}$.

PSC might induce a phenomenon that the regulated output voltage $V_{OUT}$ varies while load 20 is changed. It is because that parasitic resistance exists inevitably between output power node OUT and secondary winding SEC, such that output voltage $V_{OUT}$ is somehow smaller than cross voltage $V_{SEC}$ and the voltage difference there between increases along with the increase of output current $I_{OUT}$. In other words, to make output voltage $V_{OUT}$ substantially independent from output current $I_{OUT}$, the target voltages that cross voltages $V_{SEC}$ and $V_{AUX}$ are controlled to approach shall increase as load 20 or output current $I_{OUT}$ increases, such that the voltage difference between output power node OUT and secondary winding SEC is compensated. This kind of control concept for voltage regulation is generally referred to as load compensation.

Load compensation introduces a positive feedback loop, which, if not well designed, might cause oscillation easily. According to load compensation, for a certain load 20, the higher output current $I_{OUT}$, the higher target voltages that cross voltages $V_{SEC}$ and $V_{AUX}$ are controlled to approach. Nevertheless, the higher target voltages also need further higher output current $I_{OUT}$ to support, such that a positive feedback loop is formed. The oscillation that would company with a positive feedback loop should be avoided or damped, however, for good output voltage regulation.

BRIEF DESCRIPTION OF THE DRAWINGS

The invention can be more fully understood by the subsequent detailed description and examples with references made to the accompanying drawings, wherein.

DETAILED DESCRIPTION

Figure 1:
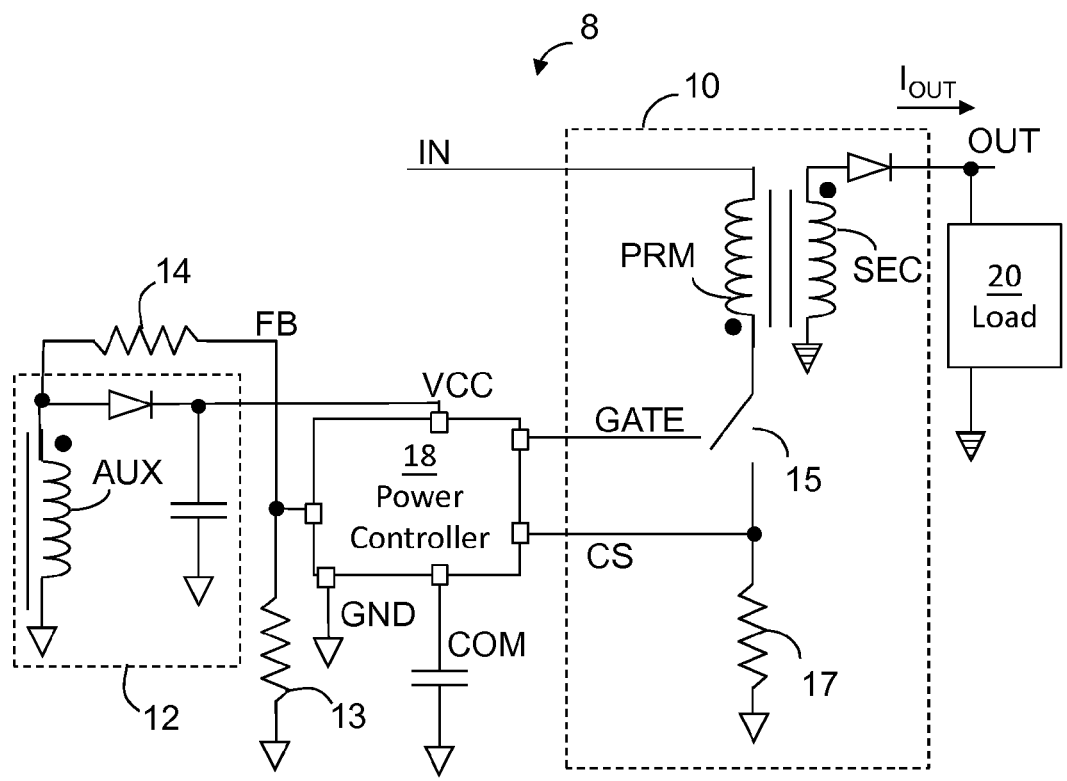
FIG. 1 demonstrates a switching-mode power supply using primary side control.

The following embodiments of the invention are used in but not limited to power supply 8 of FIG. 1. The invention is not limited to isolation structures, for example, the flyback topology exemplified in FIG. 1, and could be used in non-isolation structures, such as boosters. For instance, the invention might be embodied in a power controller, which detects cross voltage $V_{AUX}$ of an auxiliary winding that inductively coupled to a primary winding coupled between an input voltage node and an output voltage node in a booster topology.

Figure 2:
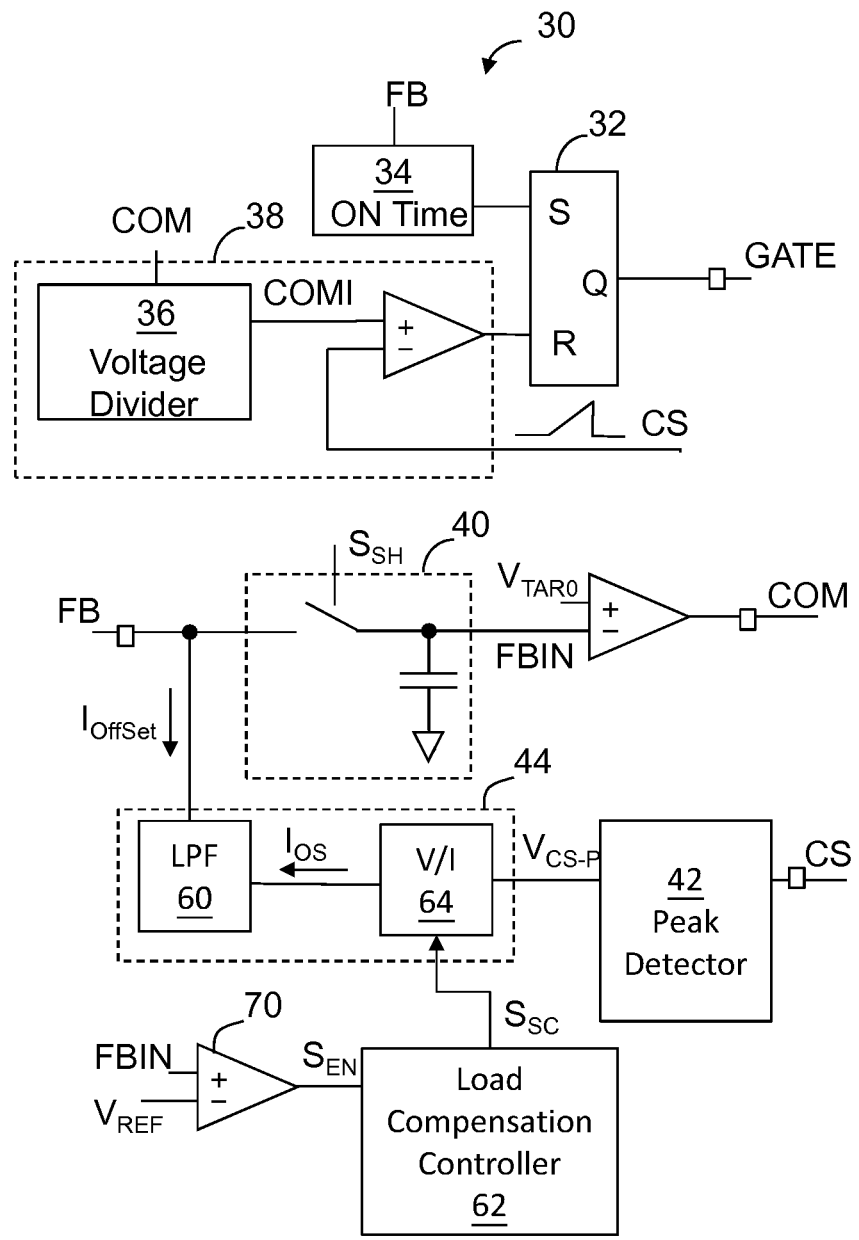
FIG. 2 demonstrates a power controller adapted for replacing the power controller of the power supply in FIG. 1 according to one embodiment of the invention.

FIG. 2 demonstrates power controller 30 adapted for being used in power controller 18 of power supply 8 of FIG. 1 according to one embodiment of the invention.

In one embodiment, circuit 34 determines the beginning of an ON time $T_{ON}$, a period of time when power switch 15 is turned ON and performs a short circuit. For example, circuit 34 could detect the complete of de-energizing of the transformer and accordingly set SR register 32, to turn on power switch 15.

Circuit 38 substantially determines the beginning of an OFF time $T_{OFF}$, a period time when power switch 15 is turned OFF and performs an open circuit. For example, voltage divider 36 generates limiting voltage $V_{COMI}$ at node COMI based on compensation voltage $V_{COM}$ at compensation node COM. When current-sensing signal $V_{CS}$ exceeds limiting voltage $V_{COMI}$, circuit 38 resets SR register 32, turning OFF power switch 15 and making it an open circuit. Accordingly, limiting voltage $V_{COMI}$ substantially determines the peak voltage of current-sensing signal $V_{CS}$.

Peak detection circuit 42 provides peak signal $V_{CS-P}$ representing the peak voltage of current-sensing signal $V_{CS}$. As peak signal $V_{CS-P}$ corresponds to the peak current flowing through primary winding PRM, it also corresponds to the output power currently output to load 20 from power supply 8.

At a moment within discharge time $T_{DIS}$, a short-pulse of signal $S_{SH}$ makes sample/hold circuit 40 sample feedback voltage $V_{FB}$ at feedback node FB to hold and provide held voltage $V_{FBIN}$ at node FBIN. The comparison result between held voltage $V_{FBIN}$ and predetermined voltage $V_{TAR0}$ determines the increase or decrease of compensation voltage $V_{COM}$. When power supply 8 makes output voltage $V_{OUT}$ a substantially constant, compensation voltage $V_{COM}$ shall remain substantially unchanged over time, and held voltage $V_{FBIN}$ shall be very close to, if not the same with, predetermined voltage $V_{TAR0}$.

Converter 44 converts peak signal $V_{CS-P}$ into load-compensation current $I_{OffSet}$. Inside converter 44 are voltage-to-current converter 64 and low-pass filter 60. Voltage-to-current converter 64 converts peak signal $V_{CS-P}$ into corresponding current $I_{OS}$. Low-pass filter 60 low passes current $I_{OS}$ to generate load-compensation current $I_{OffSet}$. Voltage-to-current converter 64 and low-pass filter 60 are exemplified and detailed later.

Please refer to both FIGS. 1 and 2, where load-compensation current $I_{OffSet}$ seems to be an offset current draining from feedback node FB to primary ground. As aforementioned, power controller 30 makes cross voltages $V_{SEC}$ and $V_{AUX}$ during discharge time $T_{DIS}$ approach target voltages, respectively referred to as $V_{SEC-TAR}$ and $V_{AUX-TAR}$, where the ratio of target voltage $V_{SEC-TAR}$ to target voltage $V_{AUX-TAR}$ should equal to the turn ratio of secondary winding SEC to auxiliary winding AUX. During discharge time $T_{DIS}$ and when output voltage $V_{OUT}$ is substantially stabilized, the following equations should be complied.

$$V_{FB}=V_{FBIN}=V_{TAR0};$$

$$V_{FB}=V_{AUX-TAR}*R_{13}/(R_{13}+R_{14})-I_{OffSet}*R_{13}*R_{14}/(R_{13}+R_{14});$$

and $$V_{AUX-TAR}=I_{OffSet}*R_{14}+V_{TAR0}*(R_{13}+R_{14})/R_{13};$$

where $R_{13}$ and $R_{14}$ represent resistances of resistors 13 and 14, respectively. It can be derived from the last equation above that the higher load-compensation current $I_{OffSet}$ the higher target voltage $V_{AUX-TAR}$ and as a result, the higher target voltage $V_{SEC-TAR}$.

When output voltage $V_{OUT}$ is substantially stabilized, power supply 8 provides a steady output power to load 20 and peak signal $V_{CS-P}$ is about a constant. The higher peak signal $V_{CS-P}$ means the higher output power. In the meantime, peak signal $V_{CS-P}$ corresponds to both current $I_{OS}$ and load-compensation current $I_{OffSet}$, and the higher load-compensation current $I_{OffSet}$ the higher target voltage $V_{SEC-TAR}$. Accordingly, during the steady state when output voltage $V_{OUT}$ is substantially stabilized, the higher output power the higher target voltage $V_{SEC-TAR}$, achieving load compensation.

Nevertheless, during a load transient when output voltage $V_{OUT}$ has not been stabilized, peak signal $V_{CS-P}$ might change dramatically, and low-pass filter 60 limits the variation rate of load-compensation current $I_{OffSet}$. Once a signal that exists in a positive feedback loop is limited in view of it variation rate, the possibility of oscillation caused by the positive feedback loop is decreased or eliminated. Accordingly, with undue diligence in circuit design, low-pass filter 60 might depress or eliminate the oscillation caused by load compensation.

Figure 3:
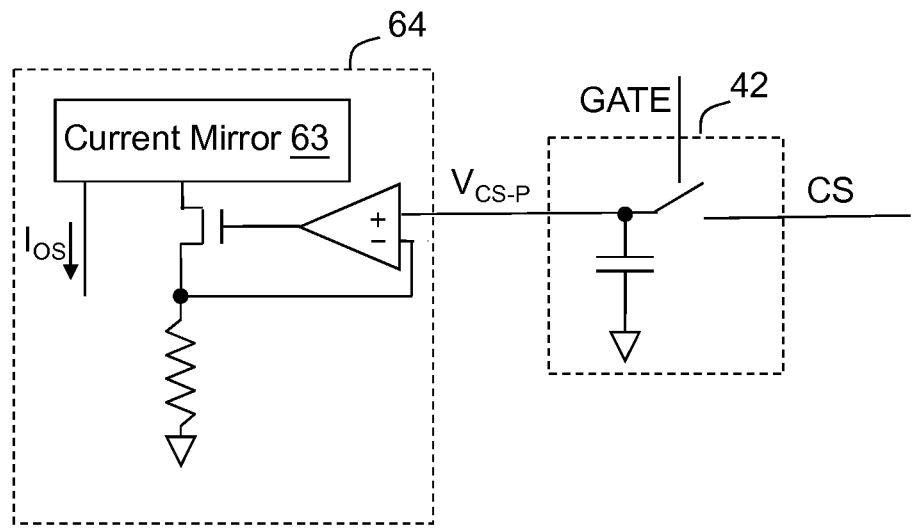
FIG. 3 demonstrates a peak detection circuit and a voltage-to-current converter.

FIG. 3 demonstrates peak detection circuit 42 and voltage-to-current converter 64 shown in FIG. 2. At the moment when power switch 15 is turned OFF, the switch in peak detection circuit 42 is turned OFF, such that peak signal $V_{CS-P}$ stored on the capacitor substantially equals to the peak voltage of current-sensing signal $V_{CS}$. Voltage-to-current converter 64 has an operational amplifier, a NMOS transistor, and a current mirror 63, the operation of which can be well derived by persons skilled in the art and is not detailed herein for brevity. Voltage-to-current converter 64 provides current $I_{OS}$ in proportion to peak signal $V_{CS-P}$.

Figure 4:
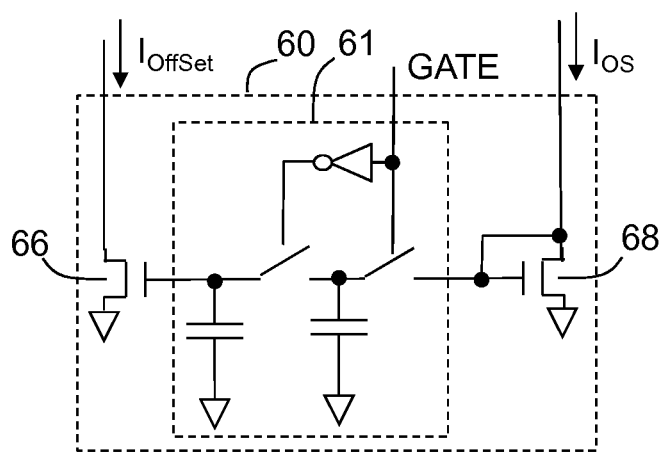
FIG. 4 demonstrates the low-pass filter shown in FIG. 2.

FIG. 4 demonstrates low-pass filter 60 shown in FIG. 2. By periodically toggling signal $V_{GATE}$ at gate node GATE, switched-capacitor low-pass filter 61 low passes the gate voltage at the control gate of NMOS 68 to provide another gate voltage at the control gate of NMOS 66. In the long run when output voltage $V_{OUT}$ is stabilized, the gate voltage of NMOS 66 should be equal to that of NMOS 68, forming a current mirror.

In the embodiment of FIG. 2, peak signal $V_{CS-P}$ is used as an output power indicator corresponding to the output power that power supply 8 provides to load 20, and load-compensation current $I_{OffSet}$ is generated according to peak signal $V_{CS-P}$. In other embodiments, compensation voltage $V_{COM}$ or limiting voltage $V_{COMI}$ could be an output power indicator to generate current $I_{OS}$ and load-compensation current $I_{OffSet}$.

In an embodiment, converter 44 that converts peak signal $V_{CS-P}$ to load-compensation current $I_{OffSet}$ might have a LPF to first low pass peak signal $V_{CS-P}$, outputting a filtered result $V_{CS-LP}$, and a voltage-to-current converter to second convert the filtered result $V_{CS-LP}$ into load-compensation current $I_{OffSet}$.

At the beginning of a startup period when, for example, a power supply is just connected to a grid outlet, the power controller of the power supply will deem the load as being heavy no matter what the load actually is, because the output voltage to the load starts from a value much lower than the required one. If load compensation starts at the startup period, load compensation will make target voltages $V_{SEC-TAR}$ and $V_{AUX-TAR}$ much higher during the startup period. The output voltage, as pulled by the much higher target voltage $V_{SEC-TAR}$, might easily overshoots if the load is light or zero in real, and the stabilization of the output voltage might be adversely delayed.

Comparator 70 and load-compensation controller 62 both in FIG. 2 could solve the output voltage overshooting caused by load compensation. Basically speaking, during the startup period, comparator 70 and load-compensation controller 62 prohibit the execution of load compensation. Only if output voltage $V_{OUT}$ is almost well built, or exceeds a certain level, then load compensation is executed softly, or little by little.

Figure 5:
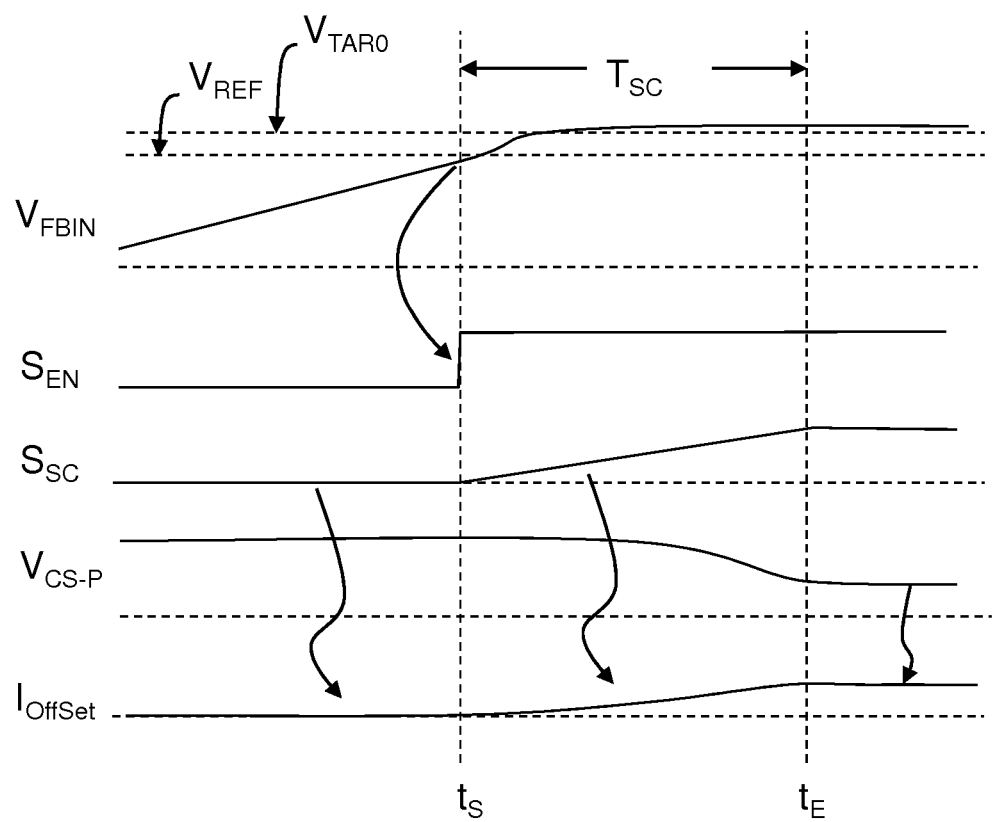
FIG. 5 shows waveforms of signals in FIG. 2.

FIG. 5 shows waveforms of signals in FIG. 2, corresponding, from top to bottom, held voltage $V_{FBIN}$, signal $S_{EN}$, ramp signal $S_{SC}$, peak signal $V_{CS-P}$, and load-compensation current $I_{OffSet}$. Held voltage $V_{FBIN}$ is the sampled result from feedback voltage $V_{FB}$ during discharge time $T_{DIS}$, substantially in proportion to output voltage $V_{OUT}$ if load compensation is not introduced. Before time point $t_S$, peak signal $V_{CS-P}$ stays at its maximum because output voltage $V_{OUT}$ is very low, held voltage $V_{FBIN}$ goes up as output power node OUT is steadily charged. In the meantime, held voltage $V_{FBIN}$ is lower than predetermined reference voltage $V_{REF}$, such that signal $S_{EN}$ output by comparator 70 is 0 in logic, ramp signal $S_{SC}$ is 0V, load-compensation current $I_{OffSet}$ is forced by load-compensation controller 62 to be 0A, and, as a result, no load compensation is introduced.

At time point $t_S$ when held voltage $V_{FBIN}$ exceeds predetermined reference voltage $V_{REF}$, comparator 70 turns its output to 1 in logic and ramp signal $S_{SC}$ starts to rise, causing load-compensation current $I_{OffSet}$ to increase slowly. In other words, load compensation is softly introduced and load-compensation current $I_{OffSet}$ is softly or little by little built. At time point $t_E$ when ramp signal $S_{SC}$ reaches its highest value, load compensation is completely introduced and load-compensation current $I_{Offset}$ is controlled by peak signal $V_{CS-P}$. The time period from time point $t_S$ to time point $t_E$ when load compensation is softly introduced is referred to as soft-compensation time $T_{SC}$.

It is shown in FIG. 2 that load-compensation controller 62 influences load-compensation current $I_{Offset}$ with the help from voltage-to-current converter 64 and low-pass filter 60. In another embodiment, load-compensation controller 62 might influence load-compensation current $I_{Offset}$ directly without low-pass filter 60 therebetween.

As shown in FIG. 5, predetermined reference voltage $V_{REF}$ could be very close to, but smaller than predetermined voltage $V_{TAR0}$, which as shown in FIG. 2 is used to compare with held voltage $V_{FBIN}$. In another embodiment, predetermined reference voltage $V_{REF}$ is equal to predetermined voltage $V_{TAR0}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for load compensation adapted for a power supply providing an output power to a load, the control method comprising:
   providing a load signal, substantially corresponding to the output power;
   low-pass filtering the load signal to generate a load-compensation signal;
   providing a feedback voltage via a feedback node coupled to an inductive device; and
   controlling the output power based on the feedback voltage to make a cross voltage of the inductive device approach a target voltage;
   wherein the higher the load-compensation signal the higher the target voltage.

2. The control method as claimed in claim 1, wherein the inductive device has a primary winding, and the control method comprises:
   detecting the current flowing through the primary winding; and
   using the peak current flowing through the primary winding as the load signal.

3. The control method as claimed in claim 1, wherein the load-compensation signal is an offset current draining from the feedback node, the feedback node is connected to the inductive device via a resistor, and the step of controlling the output power comprises:
   comparing the feedback voltage with a predetermined reference voltage to control the output power.

4. The control method as claimed in claim 1, wherein the step of low-pass filtering comprises:
   providing a switched-capacitor low-pass filter to low-pass filter the load signal.

5. The control method as claimed in claim 1, further comprising:
   comparing the feedback voltage with a predetermined voltage; and
   forcing the load-compensation signal to be 0 when the feedback voltage is less than the predetermined voltage.

6. The control method as claimed in claim 5, further comprising:
   softly building the load-compensation signal during a soft-compensation time after the feedback voltage exceeds the predetermined voltage.

7. The control method as claimed in claim 1, wherein the inductive device has a primary winding, and the control method comprises:
   detecting the peak current flowing through the primary winding to provide a peak voltage as the load signal; and
   converting the peak voltage into an offset current draining from the feedback node;
   wherein the step of low-pass filtering is performed at the same time when converting the peak voltage.

8. The control method as claimed in claim 7, wherein the step of converting comprises:
   converting the peak voltage to a first gate voltage;
   low-pass filtering the first gate voltage to generate a second gate voltage; and
   converting the second gate voltage to the offset current.

9. A power controller with load compensation adapted for a power supply powering a load, the power controller comprising:
   a converter for substantially converting a load signal at a first node to a load-compensation signal at a second node, wherein the load signal corresponds to an output power provided from the power supply to the load, and the converter includes a low-pass filter coupled between the first and second nodes; and
   a control circuit coupled to an inductive device via a feedback node, for controlling the output power to make a cross voltage of the inductive device approach a target voltage, based on a feedback voltage at the feedback node;
   wherein the higher the load-compensation signal the higher the target voltage.

10. The power controller as claimed in claim 9, wherein the converter comprises:
    a voltage-to-current converter, coupled between the first node and the low-pass filter, to convert the load signal into a first current signal;
    the low-pass filter receives the first current signal to provide a second current as the load-compensation signal.

11. The power controller as claimed in claim 9, wherein the load-compensation signal is an offset current drained from the feedback node, the feedback node is coupled to the inductive device via a resistor, and the control circuit comprises:
    a sample/hold circuit, for sampling the feedback voltage to provide a held voltage; and
    a comparator for comparing the held voltage with a first predetermined reference voltage to modify a compensation voltage;
    wherein the compensation voltage substantially determines the output power.

12. The power controller as claimed in claim 9, wherein the low-pass filter is a switched-capacitor low-pass filter.

13. The power controller as claimed in claim 9, further comprising:
    a comparator for comparing the feedback voltage with a predetermined voltage; and
    a load-compensation controller for forcing the load-compensation signal to be 0 when the feedback voltage is less than the predetermined voltage.

14. The power controller as claimed in claim 9, wherein the load-compensation controller makes the load-compensation signal softly built during a soft-compensation time after the feedback voltage exceeds the predetermined voltage.

* * * * *